(12) United States Patent
Horne

(10) Patent No.: US 11,516,897 B2
(45) Date of Patent: Nov. 29, 2022

(54) LIGHTING SYSTEM

(71) Applicant: Alliance Sports Group, L.P., Fort Worth, TX (US)

(72) Inventor: Gregory Lee Horne, Euless, TX (US)

(73) Assignee: Alliance Sports Group, L.P., Fort Worth, TX (US)

( * ) Notice: Subject to any disclaimer, the term of this patent is extended or adjusted under 35 U.S.C. 154(b) by 0 days.

(21) Appl. No.: 17/355,358

(22) Filed: Jun. 23, 2021

(65) Prior Publication Data

US 2021/0352784 A1 Nov. 11, 2021

Related U.S. Application Data

(63) Continuation of application No. 16/747,363, filed on Jan. 20, 2020, now Pat. No. 11,076,460.

(60) Provisional application No. 62/794,047, filed on Jan. 18, 2019.

(51) Int. Cl.
*H05B 45/10* (2020.01)
*H05B 45/325* (2020.01)
*H05B 47/165* (2020.01)
*H05B 47/16* (2020.01)

(52) U.S. Cl.
CPC .......... *H05B 45/10* (2020.01); *H05B 45/325* (2020.01); *H05B 47/165* (2020.01); *H05B 47/16* (2020.01)

(58) Field of Classification Search
CPC ........ H05B 45/10; H05B 45/14; H05B 45/20; H05B 45/30; H05B 45/32; H05B 45/45; H05B 45/325; H05B 47/10; H05B 47/11; H05B 47/16; H05B 47/17; H05B 47/165
See application file for complete search history.

(56) References Cited

U.S. PATENT DOCUMENTS

| 5,469,346 A | 11/1995 | Haut et al. |
| 6,055,766 A * | 5/2000 | Nolen .................... A01M 1/023 43/112 |
| 6,134,826 A * | 10/2000 | Mah ...................... A01M 1/223 43/99 |
| 7,360,921 B1 | 4/2008 | Greenspon |

(Continued)

FOREIGN PATENT DOCUMENTS

| CN | 204014833 U | 12/2014 |
| EP | 2158141 B1 | 5/2013 |

(Continued)

OTHER PUBLICATIONS

International Search Report dated Sep. 24, 2018, in International Application No. PCT/US18/35599, filed Jun. 1, 2018; 16 pages.

*Primary Examiner* — Abdullah A Riyami
*Assistant Examiner* — Syed M Kaiser
(74) *Attorney, Agent, or Firm* — Thorpe North & Western, LLP; Jed H. Hansen

(57) ABSTRACT

A lighting device is disclosed with control logic to provide a user with the option of powering on in a high power mode and cycling through to a low power mode or starting first in a lower power mode and cycling up to a higher power mode. In another aspect, the lighting device has a secondary light source that functions as a status indicator in a first mode and as a source of illumination in a second mode, wherein the power output of the first mode is less than the second mode.

19 Claims, 8 Drawing Sheets

(56) References Cited

U.S. PATENT DOCUMENTS

| | | | |
|---|---|---|---|
| 8,638,074 B2* | 1/2014 | Babcock | H02M 1/425 363/125 |
| 2002/0047009 A1* | 4/2002 | Flugstad | A23B 9/04 219/771 |
| 2002/0139984 A1 | 10/2002 | Sugawara | |
| 2004/0070352 A1* | 4/2004 | Shen | H05B 41/3928 315/291 |
| 2006/0237636 A1* | 10/2006 | Lyons | F21S 10/02 250/228 |
| 2006/0262526 A1* | 11/2006 | Dubois | F21L 14/023 362/399 |
| 2007/0146958 A1* | 6/2007 | Babcock | H02P 7/281 361/160 |
| 2007/0159008 A1* | 7/2007 | Bayat | H05B 45/345 307/112 |
| 2008/0034642 A1* | 2/2008 | Chen | A01M 1/04 43/112 |
| 2009/0190338 A1* | 7/2009 | Huang | F21L 4/00 362/240 |
| 2011/0133655 A1 | 6/2011 | Recker | |
| 2011/0157942 A1* | 6/2011 | Babcock | H02M 1/425 363/126 |
| 2012/0212963 A1* | 8/2012 | Jigamian | F21V 14/045 362/280 |
| 2013/0165226 A1* | 6/2013 | Thorner | A63F 13/285 463/37 |
| 2014/0062298 A1* | 3/2014 | Brockett | H05B 41/2813 315/39 |
| 2015/0167937 A1* | 6/2015 | Casper | F21V 29/50 362/373 |
| 2016/0101227 A1* | 4/2016 | Norris | G01V 8/20 604/29 |
| 2016/0348880 A1 | 12/2016 | Galli et al. | |
| 2017/0002994 A1 | 1/2017 | Fisher et al. | |
| 2017/0094744 A1* | 3/2017 | Chen | H05B 45/14 |
| 2017/0094960 A1 | 4/2017 | Sasaki et al. | |
| 2017/0208661 A1* | 7/2017 | Hussain | H05B 45/38 |
| 2017/0223807 A1 | 8/2017 | Recker | |
| 2018/0106616 A1* | 4/2018 | Jiang | H01S 5/042 |
| 2018/0147386 A1* | 5/2018 | Sato | F21V 7/0008 |
| 2018/0194021 A1* | 7/2018 | Nguyen | B26B 1/08 |
| 2018/0312105 A1* | 11/2018 | Bartell | G01P 15/08 |
| 2019/0150249 A1* | 5/2019 | Bertken | H04Q 9/00 315/149 |
| 2019/0313500 A1* | 10/2019 | Stevens, Jr. | H05B 47/16 |

FOREIGN PATENT DOCUMENTS

| | | | | |
|---|---|---|---|---|
| GB | 2540530 A | * | 1/2017 | A01M 1/04 |
| KR | 20090054653 A | | 6/2009 | |
| KR | 20-2013-0006888 U | | 12/2013 | |
| KR | 10-1545083 B1 | | 8/2015 | |
| KR | 10-1711395 B1 | | 3/2017 | |
| WO | WO 2008/156594 | | 12/2008 | |

* cited by examiner

LIGHTING SYSTEM

PRIORITY CLAIM

The present application claims priority to U.S. Provisional Patent Application Ser. No. 62/794,047 filed on Jan. 18, 2019 and U.S. Non-Provisional Patent Application Ser. No. 16/747,363 filed on Jan. 20, 2020, both entitled "Lighting System", which are both incorporated herein by reference in its entirety.

FIELD OF THE INVENTION

The present invention relates generally to lighting devices, systems, and associated methods and more particularly to an improved apparatus and system for providing utilitarian light in low light environments.

BACKGROUND

A typical human eye will respond to wavelengths of light from about 390 to 700 nanometers (i.e., white light). Certain handheld lights or other lights used for a variety of different purposes can emit very high levels of bright white light. However, in dark environments the human eye expands the pupils to absorb as much light as possible since the ambient light level is very low. When the user turns on these flashlights with the HIGH output as the default starting mode—the user's pupils will contract quickly to protect the eye's imaging receptors. This is an automatic biological reaction to the change in lighting levels. This will lower the user's visual sensitivity to the existing dark ambient environment. Aspects of the current technology permit a user a low-level light option to see equipment such as maps without giving away their position while also having the option of a high-level light for other uses. These aspects also result in less consumption of battery resources.

BRIEF DESCRIPTION OF THE DRAWINGS

To further clarify the above and other aspects of the present technology, a more particular description of the invention will be rendered by reference to specific aspects thereof which are illustrated in the appended drawings. It is appreciated that these drawings depict only typical aspects of the technology and are therefore not to be considered limiting of its scope. The drawings are not drawn to scale. The technology will be described and explained with additional specificity and detail through the use of the accompanying drawings in which.

DESCRIPTION OF EMBODIMENTS

Figure 1:
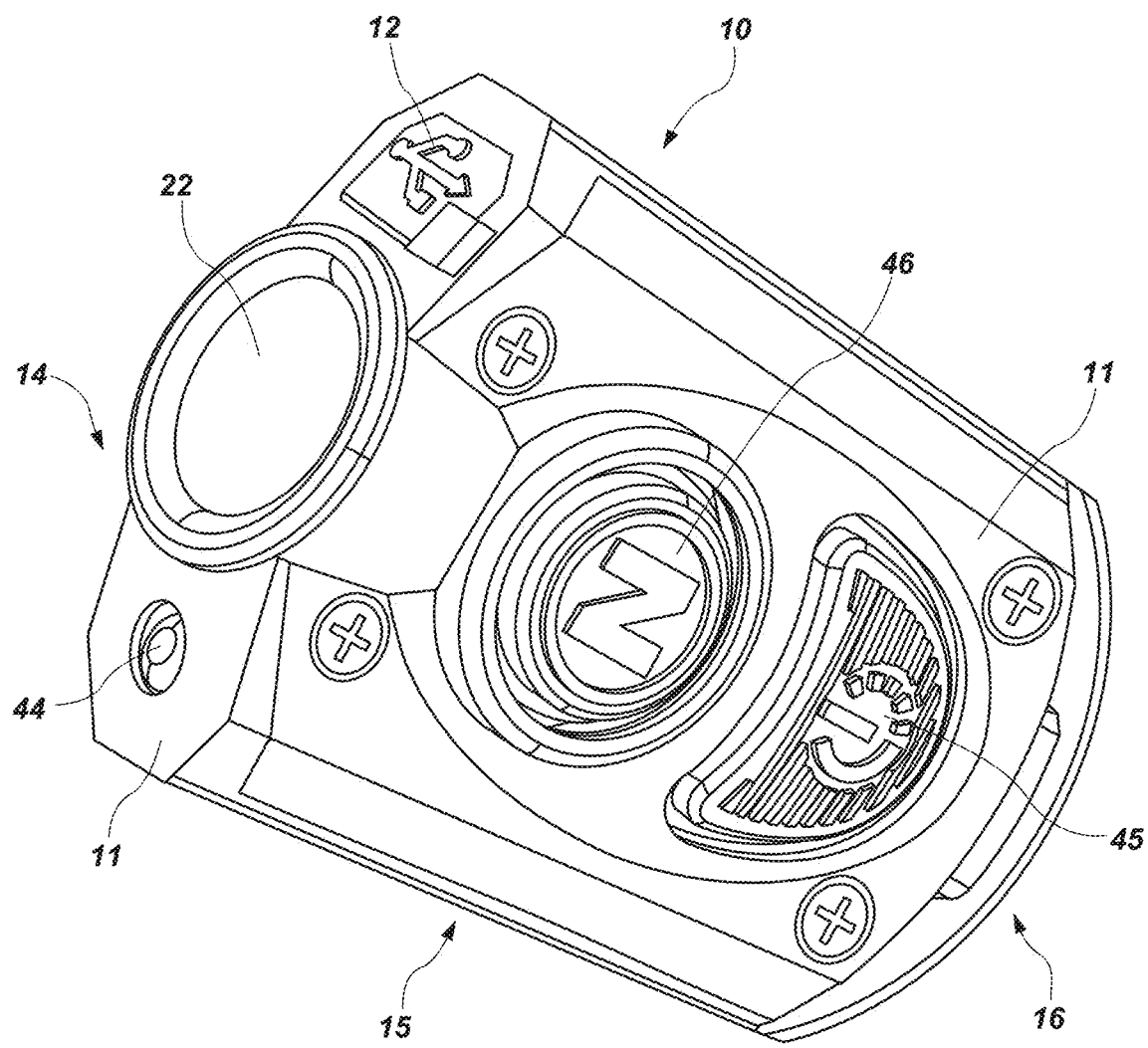
FIG. 1 is a perspective view of a lighting device in accordance with one aspect of the technology.
Figure 2:
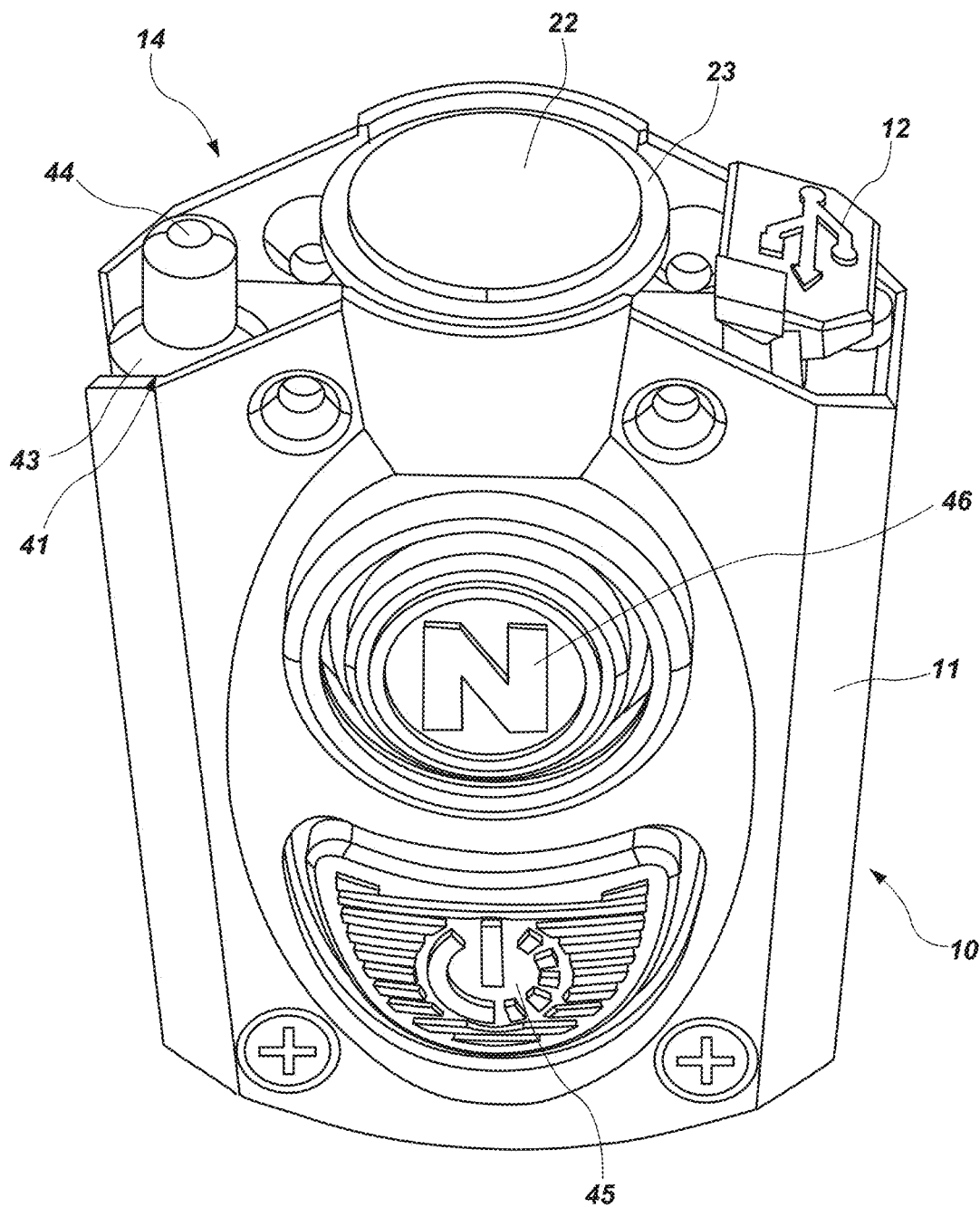
FIG. 2 is a perspective view of a lighting device in accordance with one aspect of the technology.
Figure 3:
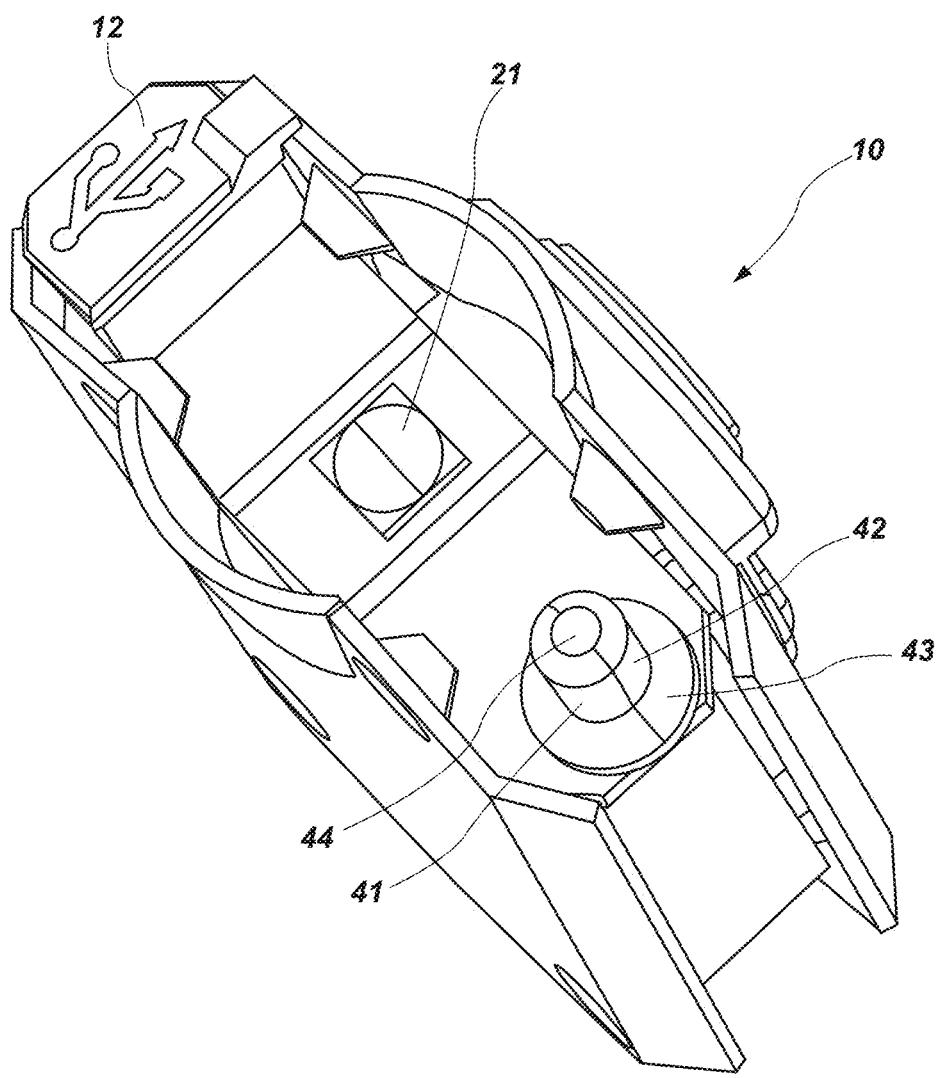
FIG. 3 is a perspective view of a lighting device in accordance with one aspect of the technology.
Figure 4:
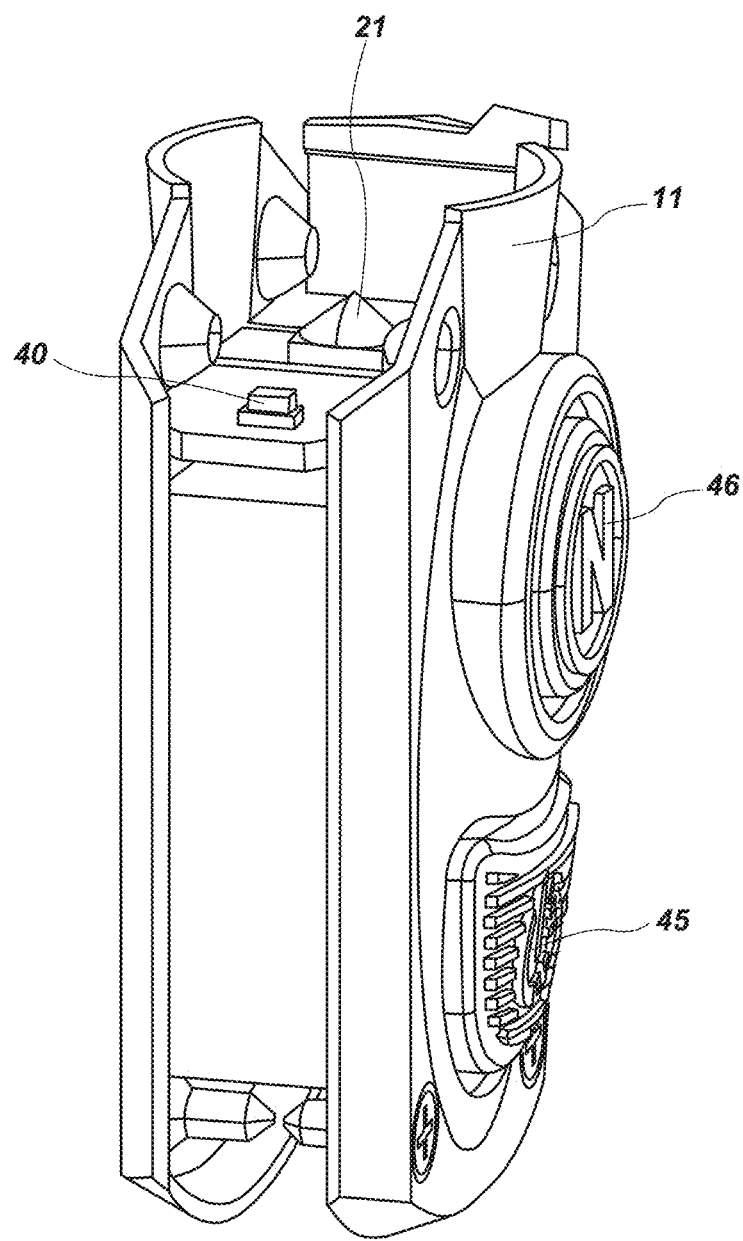
FIG. 4 is a perspective view of a lighting device in accordance with one aspect of the technology.
Figure 5:
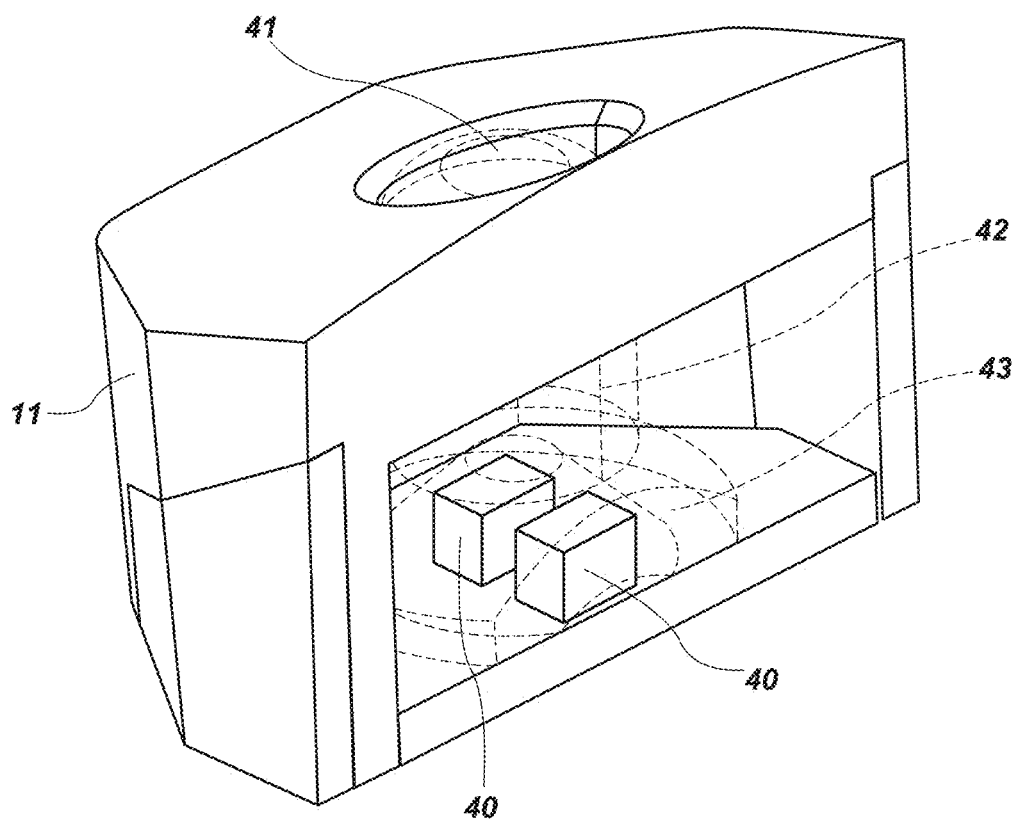
FIG. 5 is a cross section view of a portion of a lighting device in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

EXAMPLE EMBODIMENTS

An initial overview of technology embodiments is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the disclosed technology create a unique and improved utilitarian light configured and equipped with a switch for control of light mode operations to optimize battery usage in low-light or dark environments. In certain aspects of lighting technology, when a light is in an OFF position, the light can be turned to an ON position to the highest lighting level upon the initial "press" of the mode switch or power switch. Additional presses of the switch (or otherwise sequencing through the logic controls of the lighting device) step through available lower lighting modes until all the modes have been exhausted or, in other words, when the next press or sequence will turn the lighting device into an OFF mode. In one example of a handheld light, the sequence of mode settings is configured to be high, medium, low, and OFF. Other non-limiting examples include high, high strobe, medium, medium strobe, low, low strobe, OFF. In one aspect, this initial sequencing occurs when, beginning in the OFF mode, the user presses the power switch for less than ½ second.

In aspects of the current technology, when the light is in the OFF position, the user can hold the mode switch for more than ½ second (or some other predetermined period of time programmed into the logic controller) before releasing the switch to initiate the operations mode to start an alternative sequence. In one aspect, this sequence begins from the lowest level of lighting so that the output of the lighting device will not significantly interfere with the response of the human eye to a bright light in a dark or low light environment. That is, in one aspect of the technology, the light is configured such that the first light mode in the sequence is the lowest amount of light available from a particular light source (e.g., an LED). In another aspect, the light is configured such that the first light mode propagates a specific wavelength of light (e.g., a wavelength corresponding to the color red), again, intended to minimize the impact on the eyes of the user.

A typical human eye will respond to wavelengths of light from about 390 to 700 nanometers (i.e., white light). Certain handheld lights or other lights used for a variety of different purposes can emit very high levels of bright white light. However, in dark environments the human eye expands the pupils to absorb as much light as possible since the ambient light level is very low. When the user turns on these flashlights with the HIGH output as the default starting mode—the user's pupils will contract quickly to protect the eye's imaging receptors. This is an automatic biological reaction to the change in lighting levels. This will lower the user's visual sensitivity to the existing dark ambient environment even if the flashlight's output levels are set to a lower level after the initial turn ON. By starting the light output in the lower output level, the user's eyes will perceive the low-level light as a much brighter light source than it would have been otherwise perceived since the user's pupils are still expanded. This conserves battery resources as the user will be able to read and/or operate with minimal light having already acclimated to the low-light environment. This is also beneficial for tactical purposes, such as a stealth mode. Many police, military personnel, sportsmen, or other outdoor enthusiasts do not want to give up their position in a dark environment. Aspects of the current technology permit a user a low-level light option to see equipment such as maps without giving away their position while also having the option of a high-level light for other uses.

In an additional aspect of the technology, the hand held flashlight is equipped with multi-use LEDs (MLEDs). In one aspect of the technology, the MLEDs comprise LEDs configured to propagate light in a plurality of different wavelengths of light corresponding to specific colors. On many devices, these colors are used to help the user understand an operation condition of the lighting device (or other product), including, but without limitation, charge status, or other operational status (e.g., ON/OFF, WIFI enabled, etc.). These indicator lights are low power, diffuse LEDs to limit the amount of light propagated from the device. This limits the amount of battery power used by the LED to perform its function of a status or operational indicator. In one aspect of the technology, MLEDs are used not only as a status or operational indicator, but as a useable source of light. In one aspect, the MLEDs are configured to communicate with a logic controller that modifies the pulse-width-modulation (PWM) of the MLED to increase the perceived lumen output and hence the functionality of the light to the user. For example, in "indication mode" the MLED has a first PWM cycle but in a "bright mode," the MLED has a second and/or third PWM cycle. In dark environments where a conventional LED "status indicator" might normally provide some, but not enough, light to read a map or otherwise help a user, the MLED satisfies that need. In addition to a different PWM cycle, in one aspect of the technology, the lens used in connection with the MLED is optimized for focus light, rather than diffused light.

With reference now to the figures, FIGS. 1 through 5 illustrate one example of a hand-held lighting device 10. The lighting device 10 generally comprises an outside housing 11 configured with a cavity for a rechargeable power source (e.g., a battery), a primary light source 21, one or more secondary light sources 40, a control switch 45, and a logic controller such as a programmable logic controller or PLC. A PLC is a digital computer used for automation of certain electromechanical processes, such as control of machinery on factory assembly lines, amusement rides, or light fixtures. PLCs are designed for multiple arrangements of digital and analog inputs and outputs, extended temperature ranges, immunity to electrical noise, and resistance to vibration and impact. In one aspect of the technology, the instructions to control operation of the lighting device operation are stored in battery-backed-up or non-volatile memory. Memory refers to electronic circuitry that allows information, typically computer data, to be stored and retrieved.

As will be appreciated by one skilled in the art, aspects of the present technology may be embodied as a system, method or computer program product used in connection with a lighting device. Accordingly, aspects of the present technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a random access memory (RAM), a read-only memory (ROM), an erasable programmable read-only memory (EPROM or Flash memory), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present technology may be written in any combination of one or more programming languages, including an object oriented programming language such as Java, Visual Basic, SQL, C++ or the like and conventional procedural programming languages, such as the "C" programming language or similar programming languages.

With reference generally to FIGS. 1 through 5, one aspect of the technology, the primary light source comprises an LED 21 disposed at the tip of an inverted truncated cone. In one aspect of the technology, an inside surface of the inverted truncated cone is covered with a reflective coating to enhance and focus propagation of light emanating from LED 21. A charging port 12 that can be connected to an external power source to recharge the battery is disposed on a front 14 of the lighting device 10 near a lens 22 covering LED 21. However, the charging port 12 can be disposed in a convenient location on the device. Lens 22 is framed within the internal circumference of the base 23 of the inverted truncated cone associated with LED 21. In aspect of the technology, a one or more multi-use LEDs ("MLED") comprise the secondary light source 40. The secondary light source 40 is disposed on a front side 14 of the lighting device 10 opposite the charge port 12 and near the lens 22. In this manner, the direction of light propagated from the secondary light source 40 is in a direction that is parallel with a direction of light propagated or emitted from the primary light source 21. However, the secondary light source 40 can be oriented so that the light emitted from said light source is in a different direction than the primary light source 21. For example, the secondary light source 40 can be disposed on a bottom 16 of the lighting device 10 or a side 15 of the lighting device 10 as suits a particular purpose.

In one aspect of the technology, the secondary light source is housed within a lens 41 having a substantially cylindrical body 42. A base 43 of the lens 41 is sized to encapsulate one or more MLEDs and concentrate light from the LEDs through the body 42 of the lens 41 and out the distal end 44 of the lens 41. In one aspect of the technology, the base 43 approximates the shape of a truncated cone that is larger in diameter than the diameter of the body 42. However, in other aspects, the base 43 may have the same diameter as the body 42 depending on the number of MLEDs and or the desired size of the distal end 44 of lens 41. In one aspect of the technology, the PLC is configured to regulate the pulse-width-modulation (or PWM) of the LED 21 at a plurality of different duty cycles in a plurality of different sequences. PWM is one way of regulating the brightness of a light. In one aspect, light emission from the LED is controlled by pulses wherein the width of these pulses is modulated to control the amount of light perceived by the user of the lighting device. When the full direct current voltage runs through an LED, the maximum of light is emitted 100% of the time. That is, the LED 21 emits light 100% of the time when in an "ON" mode. With PWM, the voltage supplied to the LED 21 can be "ON" 50% of the time and "OFF" 50% of the time so that the LED 21 gives off its maximum amount of light only 50% of the time. This is referred to as a 50% duty cycle. In this scenario, if the ON-OFF cycle is modulated fast enough, human eyes will perceive only half the amount of light coming from the LED 21. That is, with such an input on the LED 21, the amount of light given off appears diminished by 50%. While specific reference is made to a 50% duty cycle, the LED 21 duty cycle of the light sources described herein may be greater or lesser than 50% as suits a particular purpose. In one aspect, the PLC, power source, control switch 45, and different light sources are all operably coupled together.

Figure 6:
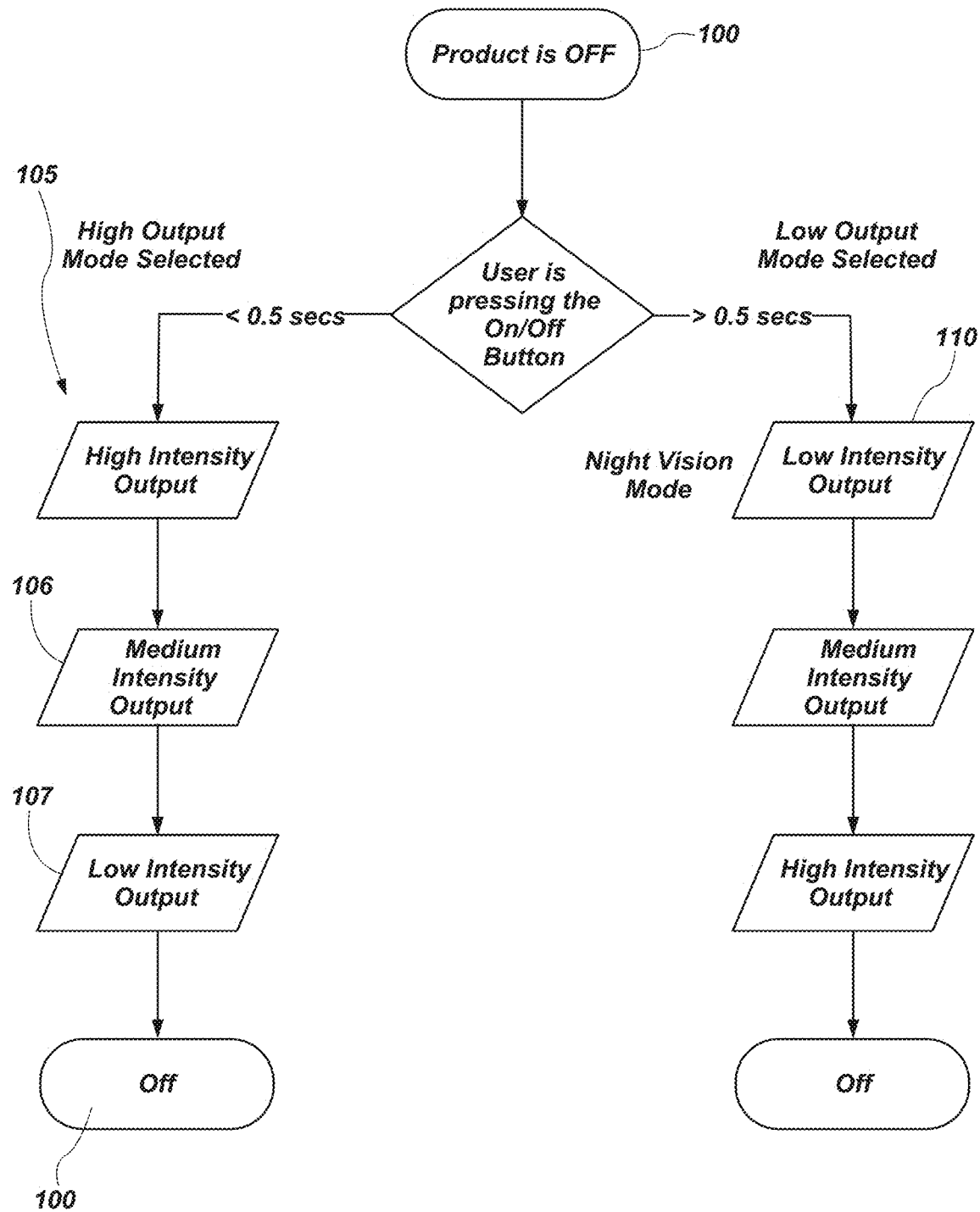
FIG. 6 is a flow chart illustrating a functional sequence of lighting of a lighting device in accordance with one aspect of the technology.

With reference now to FIG. 6, a flow diagram is shown that illustrates the different light sequencing modes of a lighting device programmed into the PLC in accordance with one aspect of the technology. Beginning in the OFF mode 100, if a user depresses the activation or on switch for less than a predetermined period of time (e.g., 0.25 seconds, 0.5 seconds, 0.75 seconds, or any range there between, etc.), the "bright first mode" 105 is activated. In the bright first mode, the LED 21 is activated in a HIGH mode, or a mode with the highest PWM setting. Subsequent activation of the power switch cycles the light through different modes, such as a MEDIUM 106 and LOW 107 modes. In one aspect of the technology, the PWM for the HIGH, MEDIUM, and LOW modes (or first, second, and third power modes) is set at a duty cycle of about 75%, 50%, and 25%, respectively, though other duty cycles may be used. In one aspect, the duty cycle for the first power mode ranges from about 70% to 80%, the second power mode ranges from about 45% to 55%, and the third power mode ranges from about 20% to 30%.

If, beginning from the OFF mode 100, the user depresses the activation switch for greater than the predetermined period of time, a "bright last mode" 110 is activated. In this aspect, the LED 21 is activated in LOW mode first 110 and then cycles to higher duty cycles with each successive activation of the switch. While specific examples of PWM duty cycles are provided, it is understood that any number of different duty cycles may be programmed into the PLC and used in connection with the primary LED 21 such that the terms LOW, MEDIUM, and HIGH, as they are used herein are not limited to the specific PWMs listed. The duty cycle need not be limited to a single LED 21. For example, one or more LEDs can be located adjacent LED 21 configured to operate at different duty cycles, or different wavelengths of light. In this manner, the "bright last mode" can include activation of a red or green LED, for example, that is activated first in the event the user wishes to start a lighting sequence with a light that is not only dim, but not colored white in an effort to minimize detection. The light sequence would then cycle through the other operational modes ending with a HIGH mode.

Figure 7:
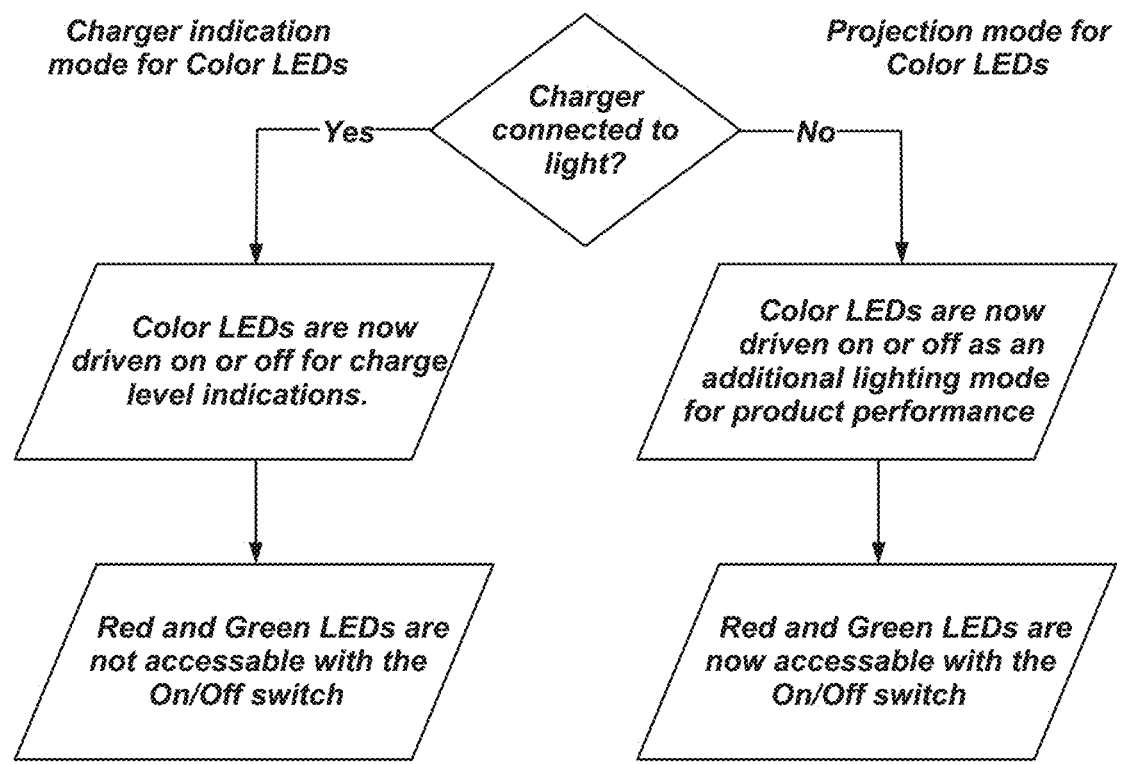
FIG. 7 is a flow chart illustrating a functional sequence of lighting of a lighting device in accordance with one aspect of the technology.

With reference generally to FIG. 7, a lighting device is equipped with a secondary light source 40 comprising multi-use LEDs (MLEDs). In one aspect of the technology, the MLEDs comprise LEDs configured to propagate light in a red (about 620 nm to about 750 nm), green (about 495 nm to about 570 nm), blue (about 450 m to about 495 nm), or other colored band. The colors are used to help the user understand an operation condition of the lighting device (or other product), including, but without limitation, charge status, or other operational status (e.g., ON/OFF, wi-fi connected, etc.). For example, a red light near a charging port can indicate that the internal battery requires charging. A green light near the charging port can indicate that the battery is fully charged. A blue light can indicate that the device is receiving a wireless or other signal. These indicator lights are low power, diffuse LEDs. The low power, diffuse nature of the LEDs limits the amount of light propagated from the device which in turn limits the amount of battery power used by the LED to perform its function of a status or operational indicator.

In one aspect of the technology, MLEDs 40 are used not only as a status or operational indicator, but as a useable source of light. In one aspect, the MLEDs 40 are configured to communicate with the PLC that modifies the pulse-width-modulation (PWM) of the MLEDs 40 to increase the perceived brightness and hence the functionality of the light to the user. For example, in "indication mode" the MLED 40 has a first PWM cycle of 30%, but in a "bright" mode, the MLED 40 has a second and/or third PWM cycle of 60% and/or 80% so that the MLED provides more light to the user than would be necessary for an "indication mode" function. The duty cycles may differ as suits a particular application. For example, the first PWM duty cycle may range from 20% to 40%, the second from 50% to 70%, and the third from 70% to 90%.

In one aspect of the technology, the MLEDs 40 are coupled to a PLC configured to modify the PWM of the MLEDs according to a pre-determined sequence programmed into the PLC. In one aspect, the modification of the lighting of the MLEDs may be activated by a user only when a charger, for example, is not connected to the charge port 12 of the lighting device 10. Meaning, if the MLEDs are functioning as a status indicator (e.g., device is charging, device is connected to wi-fi, etc.), the PLC prevents the MLEDs 40 from being operated in "bright mode." In this mode, the PWM of the MLEDs cannot be changed. Rather, the MLEDs 40 function in a default PWM where the brightness corresponds to a conventional status indicator. In one aspect of the technology, a separate power switch 46 is used to bypass the sequencing operations of the PLC and activates the primary light source 21 in its highest operating mode. In this manner, if a user does not wish to cycle through any modes of operation, including a low-light mode, the user may activate the bypass power switch 46 to turn on the brightest operating mode of the primary light 21.

In one aspect of the technology, LED lights require a driver in order to provide/deliver a desired output. The driver may be internally or externally incorporated into the LED and can be either constant current or constant voltage. Both constant current and constant voltage drivers act as a power supply for an LED light source. LED drivers provide and regulate the necessary voltage in order to maintain operation of the LED. In one aspect of the technology, a constant current LED driver operates within a range of output voltages and a fixed output current (amps). An LED is rated to operate at a forward voltage with an associated current, and a supply is needed to deliver the required operational voltage and current. In one aspect, a constant current driver varies the voltage along an electronic circuit which allows a constant electrical current through the LED device. In one aspect of the technology, a constant voltage driver operates on a single direct current (DC) output voltage (e.g., 12 VDC or 24 VDC, etc.). The driver will maintain a constant voltage no matter the load current. In one aspect of the technology, the power mode of the lighting device may be changed by changing the current that is available from the LED drive circuitry. In one aspect of the technology, an electronic circuit comprises an overall voltage supply that is high enough to span the number of LEDs in series (e.g., 3.2V is a forward voltage rating for each of three LEDs, etc.), and a 10 Ohm resistor component is used to set the desired current. By varying the resistor, brightness of the LEDs is varied up to the forward current limitation of the LED. Of course, different forward voltage ratings and different resistors, or other circuit components, may be used as a means of regulating constant current in an LED device.

Figure 8:
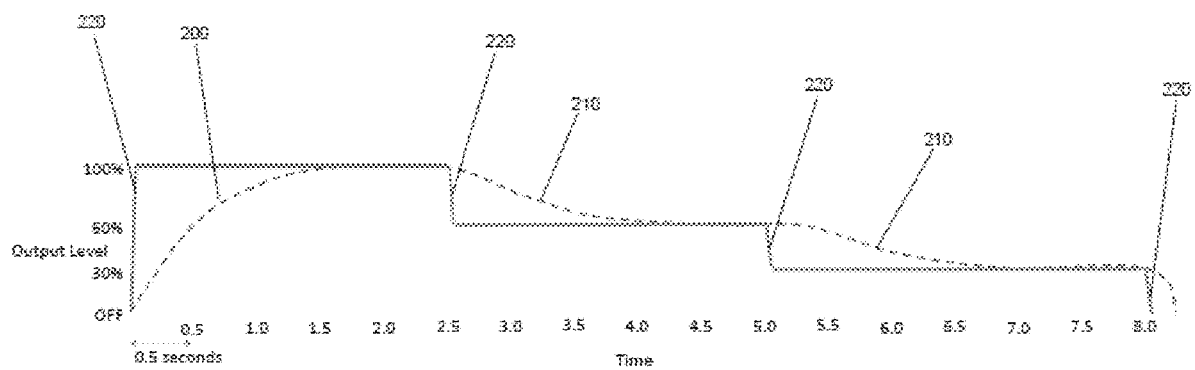
FIG. 8 is a graph illustrating the load control of a lighting device in accordance with one aspect of the technology.

With reference generally to FIG. 8, in one aspect of the technology, a load control transition program is in the PLC of a lighting device. When a lighting mode changes from one mode to another mode (e.g., High Power to Medium Power or vice versa, Medium Power to Low Power or vice versa, a change in PWM cycle, a change in constant current drive, a change in color modes, etc.), the change occurs over a period of time ranging from 800 milliseconds to 1200 milliseconds, though other periods of time may be used (e.g., 500 milliseconds to 3000 milliseconds, etc.). In one aspect, the power is transitioned (e.g., ramped up or ramped down) at a rate ranging from approximately 50% to 70% (or specific rates there between, e.g., 55%, 60%, 65%, etc.) of the load level differential per second, where the differential is defined as the target load level minus the original or beginning load level. In one aspect of the technology, the load transition rate when "ramping up" 200 is greater than the transition rate when "ramping down" 210 and vice versa. In another aspect, the load transition rate when ramping up is the same as the load transition rate when ramping down.

In one aspect of the technology, the amount of power used in a High and Medium Power mode, respectively, ranges from between 4 watts for High Power mode and 1.5 watts for Medium Power mode. In a situation where a light mode is transitioning between different power modes or duty cycles, the slower transition between modes allows the eyes to adjust to the change in brightness. More advantageously, however, less battery power is consumed when the power mode is changed over an extended period of time instead of during a "hard" switch 220. In certain aspects of the technology, the transition from one energy level to another can both draw and expel large amounts of energy as circuits can be resistive to load current changes due to typical embedded technologies such as voltage boost circuits. For example, during a "hard" or direct switch between load levels, instantaneous power consumption can be as high as 5 watts. To combat these changes, clamping circuitry such as a clamping diode can be deployed to capture the energy and dissipate it. Other complex energy management circuits can also be used to protect surrounding components from energy surges that are generated during the step function. Advantageously, aspects of the currently technology allow the power to be slowly adjusted between the different modes without complex energy management circuits. In one aspect, using the "ramping up," or "ramping down" technology, the instantaneous power consumption would not exceed the normal operational power load of 4 watts.

It is noted that no specific order is required in these methods unless required by the claims set forth herein, though generally in some embodiments, the method steps can be carried out sequentially.

The foregoing detailed description describes the technology with reference to specific exemplary aspects. However, it will be appreciated that various modifications and changes can be made without departing from the scope of the present technology as set forth in the appended claims. The detailed description and accompanying drawing are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A lighting device, comprising:
a housing with a cavity therein;
a power source disposed within the cavity;
a light source coupled to the power source,
a control switch coupled to the light source and the power source; and
a logic controller coupled to the control switch, the light source, and the power source, wherein the logic controller comprises instructions such that:
- (i) when the control switch is in the off mode and the control switch is activated for less than a predetermined period of time, the lighting device turns on the light source to a first power mode having a duty cycle greater than 50%;
- (ii) when the lighting device is turned on to the first power mode from the off mode and the control switch is activated a second time, the lighting device changes the light source to a second power mode having a duty cycle less than 50%, wherein when the load level of the lighting device is changed from the first power mode to the second power mode, the load level is changed at a rate of less than 100% of a load level differential;
- (iii) when the control switch is in the off mode and the control switch is activated for greater than the predetermined period of time, the lighting device turns on the light source to the second power mode; and
- (iv) when the lighting device is turned on to the second power mode from the off mode and the control switch is activated a second time, the lighting device changes to the first power mode.

2. The device of claim 1, wherein when the lighting device is turned on to the first power mode from the off mode and the control switch is activated a third time, the lighting device changes to a third power mode.

3. The device of claim 1, wherein the predetermined period of time ranges from 0.25 to 0.75 seconds.

4. The device of claim 1, wherein the first power mode comprises a pulse width modulation duty cycle ranging from 70% to 80% and the second power mode comprises a pulse width modulation duty cycle ranging from 45% to 55%.

5. The device of claim 1, wherein the second power mode comprises a pulse width modulation duty cycle ranging from 20% to 30%.

6. The device of claim 1, wherein the first power mode comprises a constant current of 80% of rated LED current capacity and the second power mode comprises a constant current of 40% of rated LED current capacity.

7. The device of claim 1, wherein the light source comprises one or more LEDs.

8. A hand-held lighting device, comprising:
a housing with a cavity therein;
a power source disposed within the cavity;
a primary light source disposed about a top of the lighting device and configured to propagate light in a direction that is parallel with a longitudinal axis of the lighting device, the primary light source coupled to the power source;
a secondary light source disposed about a top of the lighting device and configured to propagate light in a direction that is parallel with a longitudinal axis of the lighting device, the secondary light source coupled to the power source, wherein the secondary light source is a non-white light source and, in a first mode, indicates an operational status of the lighting device;
a control switch coupled to the primary and secondary light sources and the power source; and
a logic controller coupled to the control switch, the primary and secondary light sources, and the power source, wherein the logic controller comprises instructions such that when the secondary light source is in a first mode, it propagates light at a first pulse width modulation duty cycle less than between 30% and 50% and when the secondary light source is in a second mode, it propagates light at a second pulse width modulation duty cycle greater than 50%, wherein when a load level of the secondary light source is changed, the load level is changed at a rate of less than 100% of a load level differential per second.

9. The lighting device of claim 8, wherein the secondary light source propagates light ranging from 620 nm to 750 nm, 495 nm to 570 nm, or 450 m to 495 nm.

10. The lighting device of claim 8, wherein the logic controller contains instructions such that when the lighting device is coupled to an external power or data source, the secondary light source cannot be switched to the second mode.

11. The lighting device of claim 8, wherein the first pulse width modulation duty cycle of the secondary light source ranges from 20% to 40% and the second pulse width modulation duty cycle of the secondary light source ranges from 50% to 70%.

12. The lighting device of claim 8, wherein the primary light source and secondary light source are disposed about a distal end of the lighting device and are configured to propagate light in a parallel direction.

13. A method of operating a lighting device, comprising:
- (i) operating the lighting device comprising a control switch, a light source, and first and second power modes;
- (ii) when the control switch is in an off mode, activating the control switch for less than a predetermined period of time and turning the light source to the first power mode;
- (iii) when the lighting device is turned on to the first power mode from the off mode, activing the control switch a second time and changing the light source to the second power mode;
- (iv) when the control switch is in the off mode, activating the control switch for greater than a predetermined period of time and turning the light source to the second power mode;
- (v) when the lighting device is turned on to the second power mode from the off mode, activating the control switch a second time and changing the light source to the first power mode;
- (vi) wherein when the light source load level is changed from a first pulse width modulation duty cycle to a second pulse width modulation duty cycle, the load level is changed at a rate of less than 100% of a load level differential per second.

14. The method of claim 13, wherein the first power mode comprises a pulse width modulation duty cycle ranging from 70% to 80%.

15. The method of claim 13, wherein the second power mode comprises a pulse width modulation duty cycle ranging from 20% to 30%.

16. The method of claim 15, wherein the lighting device comprises a primary light source and a status indicator light source, wherein the status indicator light source is configured to propagate light ranging from 625 nm to 740 nm, 500 nm to 565 nm, or 450 m to 485 nm.

17. The method of claim 16, increasing the duty cycle of the status indicator light source from a first pulse width modulation duty cycle ranging from 20% to 40% to a second pulse width modulation duty cycle ranging from 50% to 70%.

18. The method of claim 17, wherein the status indicator light source is a non-white light source which cannot be switched to a second pulse width modulation duty cycle when the lighting device is connected to an external power source.

19. The method of claim 17, wherein when the status indicator light source load level is increased, the load level is changed at a rate of less than 100% of a load level differential per second.

\* \* \* \* \*

UNITED STATES PATENT AND TRADEMARK OFFICE
CERTIFICATE OF CORRECTION

| | | |
|---|---|---|
| PATENT NO. | : 11,516,897 B2 | Page 1 of 1 |
| APPLICATION NO. | : 17/355358 | |
| DATED | : November 29, 2022 | |
| INVENTOR(S) | : Gregory Lee Horne | |

It is certified that error appears in the above-identified patent and that said Letters Patent is hereby corrected as shown below:

On the Title Page

Item (12) "Horne" should read as --Horne et al.--.

Item (72), Inventors should read: Jimmy Prieto, Grand Prairie, TX (US)
Gregory Lee Horne, Euless, TX (US)

Signed and Sealed this
Thirteenth Day of August, 2024

Katherine Kelly Vidal
*Director of the United States Patent and Trademark Office*